United States Patent [19]

Matsuura et al.

[11] Patent Number: 5,231,679
[45] Date of Patent: Jul. 27, 1993

[54] IMAGE PROCESSING APPARATUS AND IMAGE REDUCING CIRCUIT THEREFOR

[75] Inventors: Hidefumi Matsuura, Moriguchi; Tadahisa Kouyama, Gifu, both of Japan

[73] Assignee: Sanyo Electric Co., Ltd., Moriguchi, Japan

[21] Appl. No.: 572,658

[22] Filed: Aug. 27, 1990

[30] Foreign Application Priority Data

Sep. 1, 1989 [JP] Japan ................... 1-227881

[51] Int. Cl.$^5$ .................. G06K 9/42; G06K 9/54; G06K 9/36; G06F 1/00
[52] U.S. Cl. ................... 382/47; 382/41; 382/49; 382/56; 364/931.41; 364/276.8; 364/229.2; 358/451
[58] Field of Search ............ 382/49, 47, 56, 41; 364/931.4, 931.41, 276.8, 229, 229.2, 134; 358/451

[56] References Cited

U.S. PATENT DOCUMENTS

| | | | |
|---|---|---|---|
| 4,123,794 | 10/1978 | Matsumoto | 364/134 |
| 4,684,997 | 8/1987 | Romeo et al. | 382/56 |
| 4,811,413 | 3/1989 | Kimmel | 382/49 |
| 4,893,258 | 1/1990 | Sakuragi | 382/47 |

OTHER PUBLICATIONS

Mano, Morris, M., *Computer System Architecture*, Prentice Hall, Inc., 1982, (pp. 414-459).

*Primary Examiner*—David K. Moore
*Assistant Examiner*—Michael Cammarata
*Attorney, Agent, or Firm*—Armstrong & Kubovcik

[57] ABSTRACT

An image processing apparatus is disclosed in which image information read by image information read-out means is reduced by reducing encoding means and simultaneously compressed by compressing means to be displayed as an image, or encoded image information is decoded by decoding means to be stored in a memory and simultaneously is reduced by reducing means to be displayed as an image, thus the apparatus can implement rapid processings, and reducing circuit for image information which reduces image information in the main scanning direction and makes storage means store reduced image information sequentially and simultaneously further reduces this reduced image information in the subscanning direction.

12 Claims, 10 Drawing Sheets

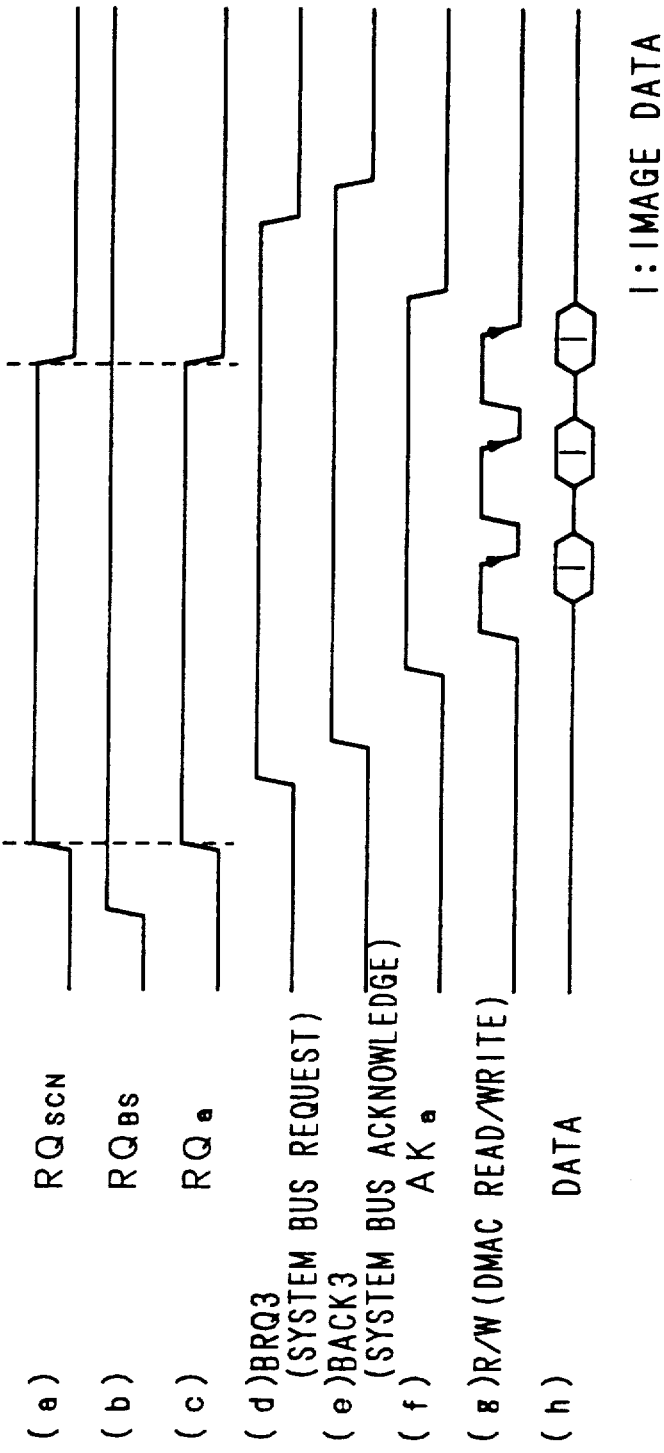

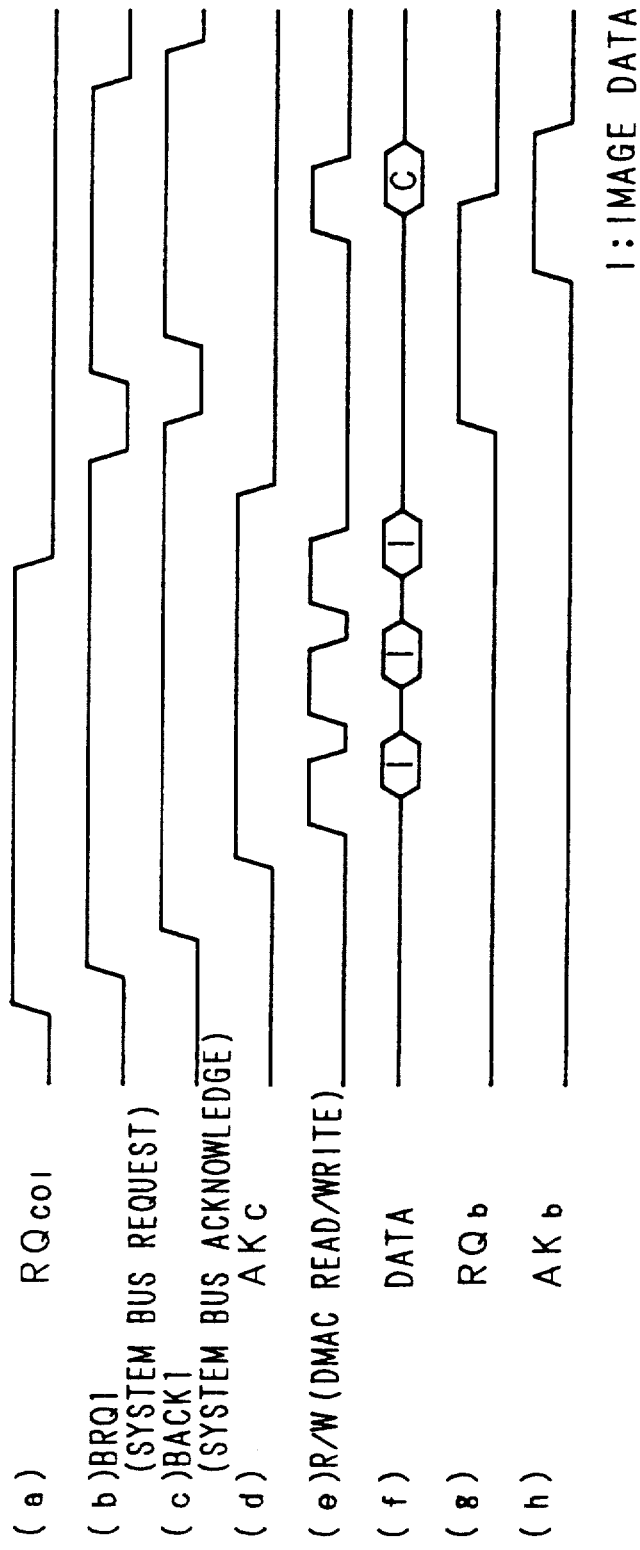

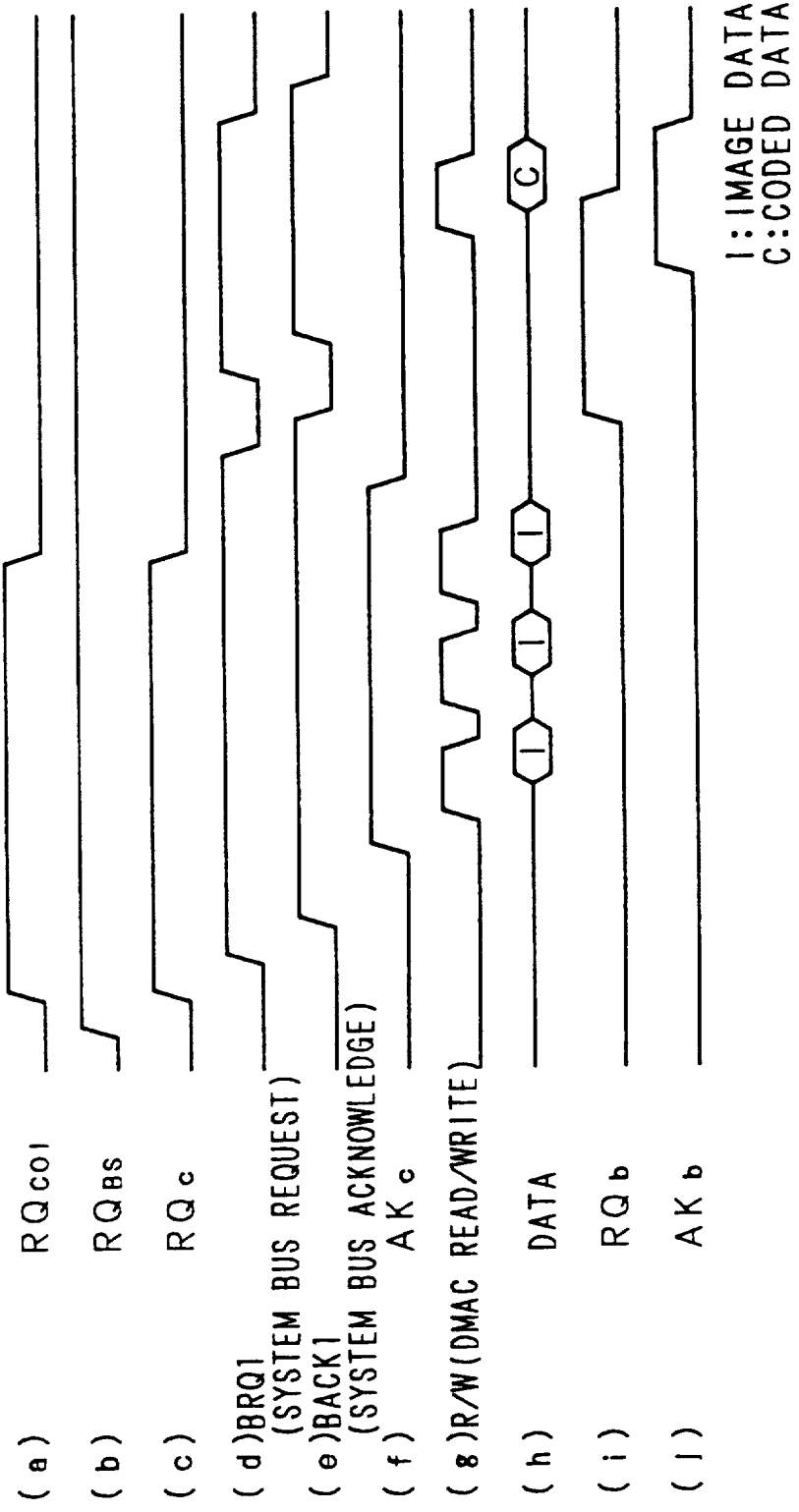

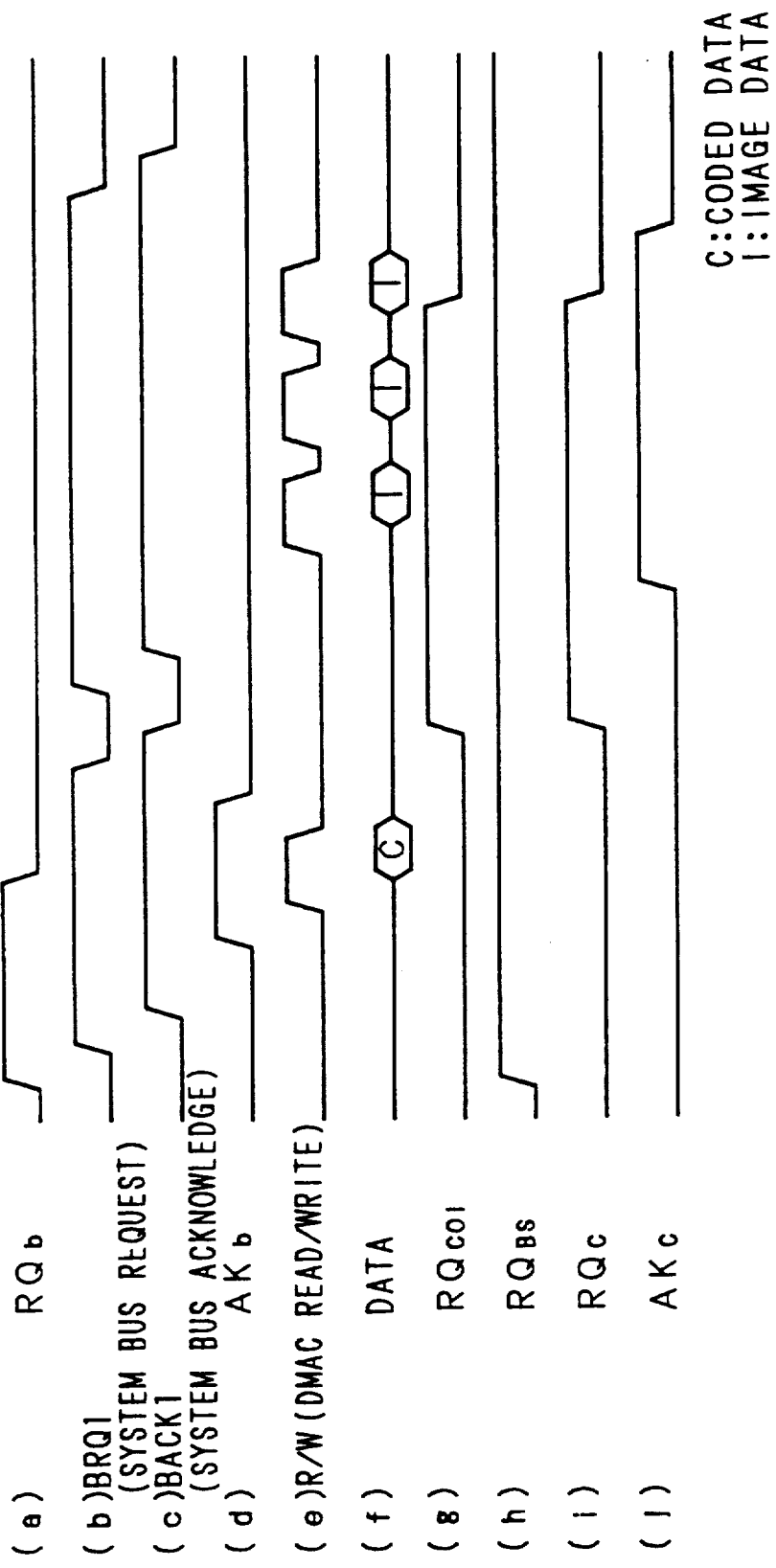

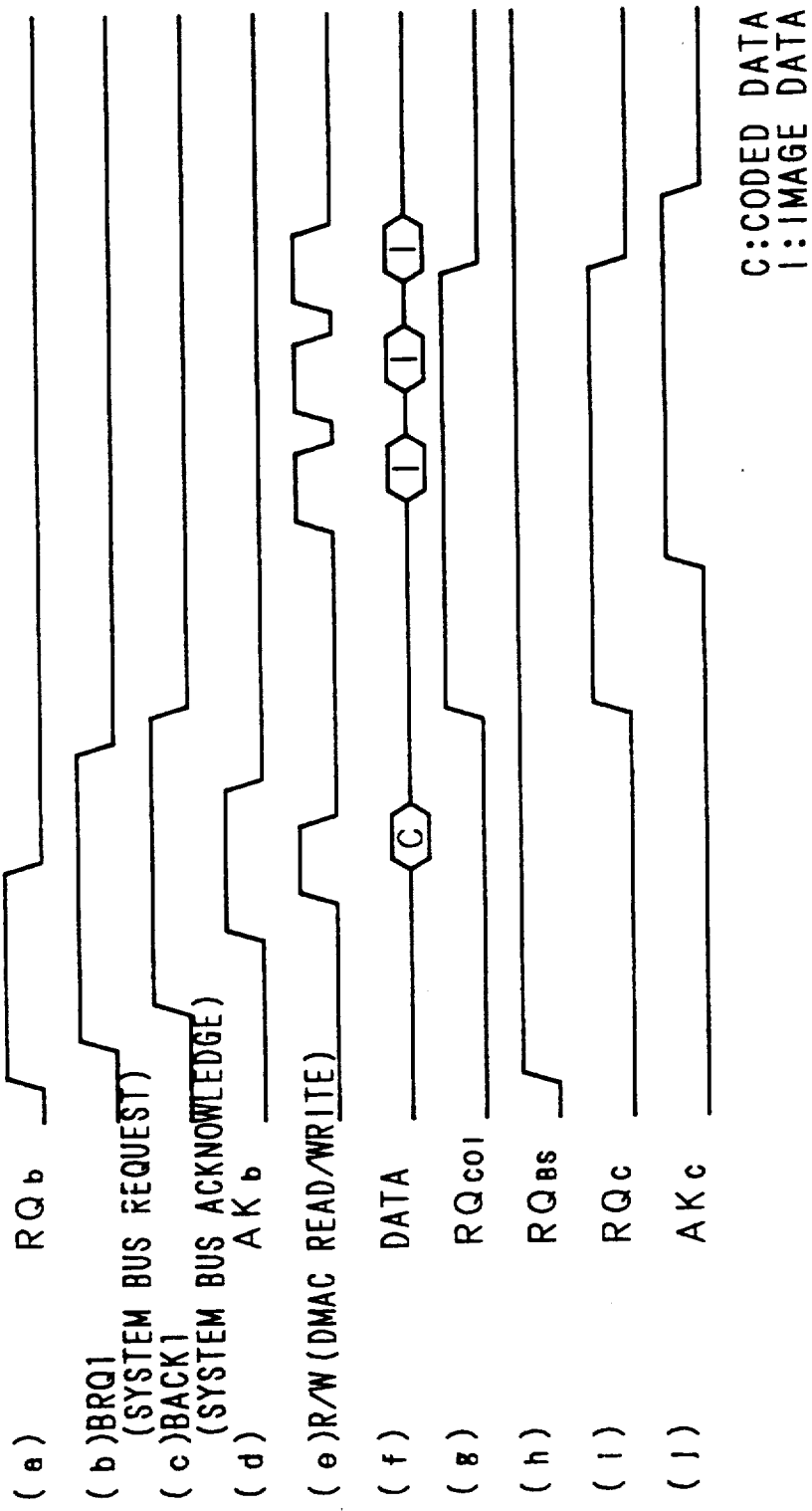

IMAGE PROCESSING APPARATUS AND IMAGE REDUCING CIRCUIT THEREFOR

BACKGROUND OF THE INVENTION

1. Field of the Invention

This invention relates to an image processing apparatus and an incorporated image reducing circuit therefor for an image information filing system and the like in which image information read by an image read-out device, for example, an image scanner is compressed and encoded to be stored in a storage medium such as an optical disk, or compressed and encoded image information is expanded to be restored to original image information for displaying or hard copying when necessary.

2. Description of Related Art

Recently, for the purpose of rationalization for increasing business data processing, so-called image information filing systems are being developed and being brought to practical use. The image information filing system is generally an unit, for example, a Sanyo Electric Co., Ltd.'s model SOF-M88 which storing documents, drawings and the like in a large capacity storage medium in page unit image information (filing) and read stored image information to display it on a display device or produce hard copies of it when necessary.

In such an image information filing system, image information to be filed is obtained from optically reading documents, drawings and the like of original images by an image information read-out device such as an image scanner to convert them into dot data. Then image information is processed for editing and compressed and encoded to be stored on an optical disk.

Now, an image size used in the field of so-called electronic filing systems is the A3 size and a resolution of the image scanner is about 400 dpi (Dots Per Inch) as standard. But the resolution of a CRT display of the display device is far less than 400 dpi. Therefore, when displaying the original image on the CRT display or producing a hard copy, it is necessary to reduce a number of dots, that is, to perform reducing processing. Such a reducing processing of an image is implemented so far by a dedicated LSI, for example, a MATSUSHITA ELECTRONICS Co., Ltd.'s model MN8617 or the like.

In the case of displaying on the display device such as a CRT display image information read by the image scanner, image information is generally stored once in an image memory and thereafter reduced by the dedicated LSI and displayed.

For example, when reducing A3 size image information with a resolution of 400 dpi ($4864 \times 6560$ dots) into A4 size image information with a resolution of 200 dpi ($1728 \times 2304$ dots), assuming that a time required for the image scanner to read a main scanning one line is 1 ms, a reducing processing speed by the MN8617 is 0.3 $\mu$s/bit, then > time required to read:
>
> 1 ms $\times$ 6560 lines = 6.56 s
>
> time required for reducing processing:
>
> $(4864 \times 6560 + 1728 \times 2304) \times 0.3 \times 10^{-6} = 10.8$ s and a total time for start-up of reading the original image to start-up of displaying image information is approximately 18 s.

In order to display a reduced image, encoded, and stored in a storage medium such as an optical disk, it is required to expand and decode this compressed, encoded and optical disk-stored image information to restore the original image information and thereafter reduce it to display the image. In this case, the decoding process requires several seconds, in addition the reducing process requires about 10.8 seconds as mentioned above. Such a time is only a boring waiting time for the image information filing system operator and reduces business data processing efficiency.

In view of this situation, Japanese Patent Applications Laid-Open No. 64-32383 (1989), No. 64-32384 (1989) and No. 1-276275 (1989) have been proposed.

The invention of the first Japanese Patent Application Laid-Open No. 64-32383 (1989) is substantially the same as the No. 64-32384 (1989) and comprises:

"first storage means for storing stored information;

first processing means for searching for desired stored information from stored information stored in the first storage means;

second storage means for temporarily storing stored information searched for by said first processing means;

display means for displaying stored information searched for by the first processing means;

recording means for recording and outputting stored information searched for by the first processing means; and second processing means for simultaneously controlling a processing of storing stored information searched for by the first processing means into said second storage means and a processing of making the display means display stored information and a processing of making the recording means record and output the stored information."

Further, first processing means includes decoding means for decoding stored information searched for by storage means, and second processing means includes enlarging/reducing means for enlarging/reducing stored information searched for by first processing means.

More concretely, the above invention performs in parallel a processing of restoring encoded information already compressed, encoded, and stored in an optical disk unit which is the first storage means to image information by decoding means and storing restored image information into the second storage means which is a page memory and a processing of displaying restored image information on display means in a displayable reduced form, and a processing of printing out restored image information by a recording means which is a printer.

However, in the above invention, enlarging/reducing means is not directly connected to a bus and provided in second processing means, thus its usage is limited. For example, in the case of recording the original image, processings of enlarging/reducing means used for displaying the original image on the display device are not performed in parallel, thus a waiting time arises as usual.

Further, in the above invention, when some components are operated in parallel, it is required to initialize each component from the viewpoint of software, as a result a time for signal processing is required.

The invention of the third Japanese Patent Application Laid-Open No. 1-276275 (1989) discloses image information processings in which when decoding compressed, encoded, and stored image information, and when reading the original image to compress and encode it, simultaneous enlarging/reducing process reduces a number of access times against image memory to increase a process speed. But in the system of this invention, image information is processed only through a path along code decoding means, enlarging/reducing means and an image display (print out), or a path along a read-out device for the original image, expanding/compressing means and code decoding means. Therefore, parallel processings can not be implemented in such a way that a read original image is processed through enlarging/reducing means to be displayed and simultaneously is compressed and encoded to be stored in an optical disk.

SUMMARY OF THE INVENTION

This invention is attained in view of the above situation, and therefore it is a principal object of the invention to provide an image processing apparatus in which an original image can be quickly displayed when compressed, encoded data produced by original image reading is stored into an optical disk and also an image can be quickly displayed by simultaneous enlarging/reducing processings when compressed, encoded and stored image information is decoded.

Another object of the invention is to provide a circuit configuration for enlarging/reducing image information as mentioned above.

The image processing apparatus of the invention comprises a compressing/expanding circuit or a scanner, which is first image information processing means connected to a bus, enlarging/reducing means which is of second image information processing means connected to the bus, a memory connected to the bus, transfer request generating means for an image information input/output request from first image information processing means and second image information processing means and for generating image information transfer request from first image information processing means to the memory or therefrom to first image information processing means, and transfer control means for transferring image information in response to a transfer request produced by decision means. Enlarging/reducing means which is second image information processing means receives image information to process it when image information is transferred from first image information processing means to the memory or therefrom to first image information processing means by the transfer control means. Thus, when reading the original image by the scanner, when expanding and decoding compressed, encoded and stored image information, and when compressing and encoding a read image to store it, reduced image information for display can be quickly obtained.

Further, an image reducing circuit of the invention comprises main scanning direction compressing means for reducing image information in its main scanning direction according to a specified reducing rate, storage means for storing respective main scanning direction informations reduced by the main scanning direction reducing means, and subscanning direction reducing means for performing logical operations, by times according to the reducing rate, of main scanning direction image information stored in the storage means and respective main scanning direction image informations reduced by the main scanning direction reducing means to store the results in the storage means.

The above and further objects and features of the invention will more fully be apparent from the following detailed description with accompanying drawings.

BRIEF DESCRIPTION OF THE DRAWINGS

FIG. 2 is a timing chart in the case of an interlock input processing, FIG. 4 is a timing chart in the case of a simple compressing processing of an image processing apparatus of the invention, FIG. 5 is a timing chart in the case of an interlock compressing processing of an image processing apparatus of the invention, FIG. 6 is a timing chart in the case of an interlock expanding processing of an image processing apparatus of the invention, FIGS. 7($a$) and 7($b$) are block diagrams which, taken together, show another embodiment of the invention, and FIG. 8 is a timing chart showing operations of the embodiment shown in FIGS. 7($a$) and 7($b$)

DESCRIPTION OF THE PREFERRED EMBODIMENTS

The embodiment of the invention will now be described in detail with reference to the accompanying drawings.

Figure 1A:
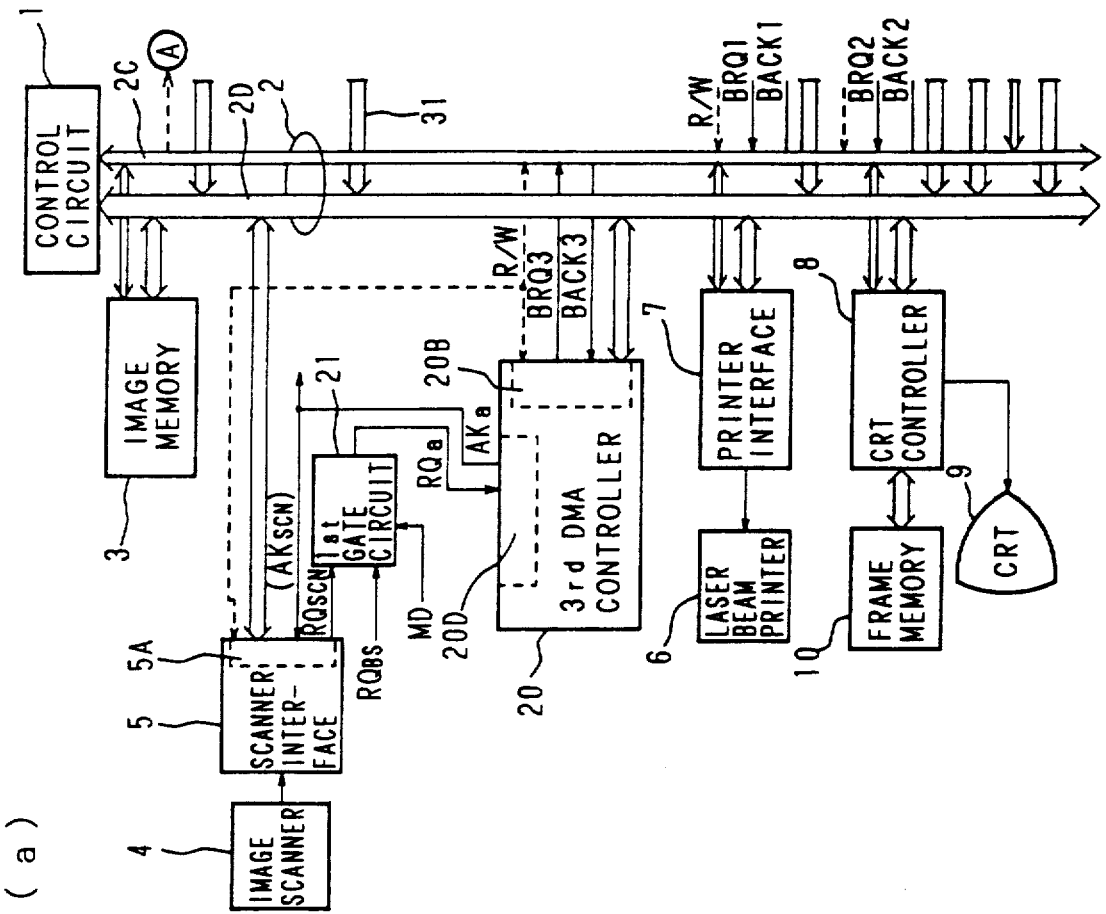
FIGS. 1($a$) and 1($b$) are block diagrams which, taken together, show one embodiment of an image information filing system incorporating an apparatus of the invention.

FIGS. 1($a$) and 1($b$) are block diagrams showing one embodiment of an image information filing system incorporating an apparatus of the invention.

In FIGS. 1($a$) and 1($b$), reference numeral 1 denotes a control circuit composed of, for example, a microprocessor and controls the whole apparatus of the invention. The control circuit 1 outputs a control signal MD to interlock-control a main scanning direction reducing circuit 12 described hereafter.

The control signal MD specifies operations of the main scanning direction reducing circuit 12 according to its set value as follows:

MD=0: does not interlock with other processing.
MD=1: interlocks with an image input processing.
MD=2: interlocks with a decoding processing.
MD=3: interlocks with a decoding processing and operates continuously.
MD=4: interlocks with a compressing and encoding processing.

The control circuit 1 is connected with a system bus 2 composed of a data bus 2D and a control bus 2C and transmits and receives data (image information) and control signals to and from various components of the apparatus of the invention as described later.

Reference numeral 3 denotes an image memory, which is composed of a dynamic RAM having a storage capacity of several megabytes. This image memory 3 is provided with a page memory area for storing original image information of a dot display and a code buffer area for storing compressed and encoded image information.

Reference numeral 4 denotes an image sensor, which is connected to the system bus 2 through a scanner interface 5. The image scanner 4 optically reads an original image to convert it into a dot image and outputs it as serial data image information. This serial data image information outputted from the image scanner 4 is converted into parallel data by the scanner interface 5, and parallel data is stored into the image memory 3 through the system bus 2 by a third DMA controller 20. The scanner interface 5 is provided with a DMA control portion 5A for DMA transfer.

Reference numeral 6 denotes a laser beam printer, which is connected to the system bus 2 through a printer interface 7. The laser beam printer 6 converts parallel image data in the page memory area within the image memory 3 into serial data by the printer interface 7 to record the data in a predetermined form to produce hard copies.

Reference numeral 10 denotes a frame memory and numeral 9 a CRT display, both of them being connected with the system bus 2 through a CRT controller 8. The CRT controller 8 generates a synchronizing signal for the CRT display 9 to read display information stored in the frame memory 10 in synchronization with the signal and displays an image on the CRT display 9. The CRT controller 8 further transfers image information (display information) to and from the image memory 3, a subscanning direction reducing circuit 13 described later and the frame memory 10.

Reference numeral 11 denotes a compressing/expanding circuit, which compresses and encodes original image information and expands and decodes compressed and encoded image information to restore original image information. The compressing/expanding circuit 11 is provided with a code side DMA control portion 11C connected to the system bus 2 through a sub-data bus 31 and an image side DMA control portion 11I connected to the system bus 2 and the main scanning direction reducing circuit 12 through a sub-data bus 30. The sub-data bus 30 is provided with an interposed bus driver 25 which controls data transfer from the system bus 2 to the compressing/expanding circuit 11 and the main scanning direction reducing circuit 12 or in the reverse direction.

Reference numeral 12 is the abovementioned main scanning direction reducing circuit, which is provided with a source side DMA control portion 12S connected to the sub-data bus 30 on an image information input side and a destination side DMA control portion 12D connected to the subscanning direction reducing circuit 13 on an image information output side. The main scanning direction reducing circuit 12 receives image information read by the image scanner 4 or stored in the image memory 3 through the bus driver 25 or directly receives image information expanded and decoded by the compressing/expanding circuit 11, each through the source side DMA control portion 12S to reduce main scanning direction image information. Image information reducing in the main scanning direction is outputted from the destination side DMA control portion 12D to the subscanning direction reducing circuit 13.

Reference numeral 13 is the abovementioned subscanning direction reducing circuit, which reduces in the subscanning direction image information reduced by the main scanning direction reducing circuit 12 in the main scanning direction. An output terminal of the subscanning direction reducing circuit 13 is connected to the system bus 2.

Reference numeral 14 denotes a first DMA controller, which controls image information transfer to and from the compressing/expanding circuit 11, image memory 3 and an optical disk interface 17 described later, and also controls transfer of image information expanded, decoded by the compressing/expanding circuit 11 to the main scanning direction reducing circuit 12. The first DMA controller 14 is provided with a bus interface portion 14B connected to the system bus 2 and a DMA request arbitrating portion 14D which transmits and receives different signals described later to arbitrate transfer requests.

Reference numeral 15 denotes a second DMA controller, which controls image information transfer from the main scanning direction reducing circuit 12 to the subscanning direction reducing circuit 13. This second DMA controller 15 is provided with a bus interface portion 15B, which is connected with the system bus 2, and a DMA request arbitrating portion 15D which transmits and receives a signal described later.

Reference numeral 20 denotes a third DMA controller, which controls image information transfer between the scanner interface 5 and the image memory 3, or the main scanning direction reducing circuit 12. This third DMA controller 20 is provided with a bus interface portion 20B connected to the system bus 2 and a DMA request arbitrating portion 20D which transmits and receives a signal described later.

Reference numeral 18 denotes an optical disk unit, which is connected to the system bus 2 through the optical disk interface 17. The optical disk unit 18 functions as image information recording means which stores a large amount of compressed, encoded image information by using the optical disk as a storage medium.

Reference numerals 21, 22, 23 and 24 denote a first, second third and a fourth gate circuits respectively.

The first gate circuit 21 logically processes a DMA transfer request signal $RQ_{SCN}$ outputted from the DMA control portion 5A of the scanner interface 5 or an image information input enable signal $RQ_{BS}$ outputted from the source side DMA control portion 12S of the main scanning direction reducing circuit 12 in response to a set value of the control signal MD to output the processed signal to the DMA request arbitrating portion 20D of the third DMA controller 20 as a DMA transfer request signal RQa.

The second gate circuit 22 selects either a DMA transfer enable signal AKa from the DMA request arbitrating portion 20D of the third DMA controller 20 or a DMA transfer enable signal AKc from the DMA request arbitrating portion 14D of the first DMA controller 14 in response to a set value of the control signal MD, to output the direction control signal D for the bus driver 25 by adding the selected signal to the read/write signal R/W on the control bus 2C.

The third gate circuit 23 logically processes an image information input request signal $RQ_{COI}$ from the image side DMA control portion 11I of the compressing/expanding circuit 11 or an image information input enable signal $RQ_{BS}$ from the source side DMA control portion 12S of the main scanning direction reducing circuit 12 in response to a set value of the control signal MD to output the processed signal to the DMA request arbitrating portion 14D of the first DMA controller 14 as a DMA transfer request signal RQc.

The fourth gate circuit 24 selects either the DMA transfer enable signal AKa from the DMA request arbitrating portion 20D of the third DMA controller 20 or the DMA transfer enable signal AKc from the DMA request arbitrating portion 14D of the first DMA controller 14 in response to a set value of the control signal MD to output a DMA transfer enable signal $AK_{COI}$ as an output $Y_1$ to the image side DMA control portion 11I of the compressing/expanding circuit 11 or to output a DMA transfer enable signal $AK_{BS}$ as an output $Y_2$ to the source side DMA control portion 12S of the main scanning direction reducing circuit 12.

Further, each gate circuit output signal Y corresponding to each control signal MD set value is as follows.

In addition, "X" indicates that the output is invalid and "." means a logical product.

| *MD = (simple compressing processing) | |
|---|---|
| 1st gate circuit 21 | $Y = RQ_{SCN}$ |
| 2nd gate circuit 22 | Y = D (direction a) |
| 3rd gate circuit 23 | $Y = RQ_{COI}$ |
| 4th gate circuit 24 | $Y_1$ = AKc |
| | $Y_2$ = X |
| *MD = 1 (interlock input processing) | |
| 1st gate circuit 21 | $Y = RQ_{SCN} \cdot RQ_{BS}$ |
| 2nd gate circuit 22 | Y = D (direction a) |
| 3rd gate circuit 23 | $Y = RQ_{COI}$ |
| 4th gate circuit 24 | Y = X |
| | $Y_2$ = AKa |
| *MD = 2 (interlock expanding processing) | |
| 1st gate circuit 21 | $Y = RQ_{SCN}$ |
| 2nd gate circuit 22 | Y = D (direction b) |
| 3rd gate circuit 23 | $Y = RQ_{COI} \cdot RQ_{BS}$ |
| 4th gate circuit 24 | $Y_1$ = AKc |
| | $Y_2$ = AKc |
| *MD = 4 (interlock compressng processing) | |
| 1st gate circuit 21 | $Y = RQ_{SCN}$ |
| 2nd gate circuit 22 | Y = D (direction a) |
| 3rd gate circuit 23 | $Y = RQ_{COI} \cdot RQ_{BS}$ |
| 4th gate circuit 24 | $Y_1$ = AKc |
| | $Y_2$ = AKc |

Now, signals transmitted and received between components of the apparatus of the invention are summarized as follows.

BRQ1: A system bus acquisition request signal which the first DMA controller 14 outputs when it requests to use the data bus 2D of the system bus 2.

BACK1: A system bus response signal which notifies authorization to use the system bus 2 from the control circuit 1 to the first DMA controller 14 when the first DMA controller 14 outputs the system bus acquisition request signal BRQ1.

BRQ2: A system bus acquisition request signal which the second DMA controller 15 outputs when it requests to use the system bus 2.

BACK2: A system bus response signal which notifies authorization to use the system bus 2 from the control circuit 1 to the second DMA controller 15 when the second DMA controller 15 outputs the system bus acquisition request signal BRQ2.

BRQ3: A system bus acquisition request signal which the third DMA controller 20 outputs when it requests to use the system bus 2.

BACK3: A system bus response signal which notifies authorization to use the system bus 2 from the control circuit 1 to the third DMA controller 20 when the third DMA controller 20 outputs the system bus acquisition request signal BRQ3.

$RQ_{SCN}$: A DMA transfer request signal which the scanner interface 5 generates. The signal is outputted from the scanner interface 5 to the first gate circuit 21 while there is data to be transferred in the scanner interface 5.

$AK_{SCN}$ (AKa): A DMA transfer enable signal outputted from the third DMA controller 20 to the scanner interface 5 in response to the DMA transfer request signal $RQ_{SCN}$.

$RQ_{COC}$ (RQb): A DMA transfer request signal which the code side DMA control portion 11C of the compressing/expanding circuit 11 generates. The signal is outputted when the compressing/expanding circuit 11 requests code information input/output due to DMA transfer.

$AK_{COC}$ (AKb): A DMA transfer enable signal outputted from the first DMA controller 14 to the code side DMA control portion 11C of the compressing/expanding circuit 11 in response to the DMA transfer request signal $RQ_{COC}$. The compressing/expanding circuit 11 is enabled to perform the DMA transfer at the code side DMA control portion 11C while this signal is active, and reads/writes data in synchronization with a read/write signal R/W at that time.

$RQ_{COI}$: A DMA transfer request signal which the image side DMA control portion 11I of the compressing/expanding circuit 11 generates. The signal is outputted when the compressing/expanding circuit 11 requests image information input/output due to DMA transfer.

$AK_{COI}$: A DMA transfer enable signal outputted from the DMA controller in response to the DMA transfer request signal $RQ_{COI}$. The compressing/expanding circuit 11 is enabled to perform the DMA transfer at the image side DMA control portion 11I while this signal is active, and reads/writes data in synchronization with a read/write signal R/W at that time.

$RQ_{BS}$: An image information input enable signal which the source side DMA control portion 12S of the main scanning direction reducing circuit 12 generates. The signal is outputted when the main scanning direction reducing circuit 12 requests image information input due to the DMA transfer and is inputted to the first gate circuit 21 and the third gate circuit 23.

$AK_{BS}$: A DMA transfer enable signal which is outputted from the first DMA controller 14 in response to the DMA transfer request signal $RQ_{BS}$ and is inputted to the main scanning direction reducing circuit 12 through the fourth gate circuit 24. The main scanning direction reducing circuit 12 is enabled to perform the DMA transfer at the source side DMA control portion 12S while this signal is active, and receives data in synchronization with a read/write signal R/W at that time.

$RQ_{BD}$ (RQd): A DMA transfer request signal which the destination side DMA control portion 12D of the main scanning direction reducing circuit 12 generates. The signal is outputted from the main scanning direction reducing circuit 12 to the second DMA controller 15 when the main scanning direction reduced circuit 12 requests main scanning direction reduced image information output due to the DMA transfer.

$AK_{BD}$ (AKd): A DMA transfer enable signal which is outputted from the second DMA controller 15 in response to the DMA transfer request signal $RQ_{BD}$. The main scanning direction reducing circuit 12 is enabled to perform the DMA transfer at the destination side DMA control portion 12D while this signal is active, and outputs main scanning direction reducing image information to the subscanning direction reducing circuit 13 in synchronization with a read/write signal R/W at that time.

RQa: A DMA transfer request signal to the third DMA controller 20. It is processed and outputted by the first gate circuit 21 based on the DMA transfer request signal $RQ_{SCN}$ and information input enable signal $RQ_{BD}$.

AKa: A DMA transfer enable signal which the third DMA controller 20 outputs in response to the DMA transfer request signal RQa. The signal is given to the scanner interface 5 as the DMA transfer enable signal $AK_{SCN}$ and also is given to the second gate circuit 22 and the fourth gate circuit 24.

RQb: A DMA transfer request signal which is outputted from the code side DMA control portion 11C of the compressing/expanding circuit 11 to the first DMA controller 14 as the DMA transfer request signal $RQ_{COC}$.

AKb: A DMA transfer enable signal which the first DMA controller 14 outputs in response to the DMA transfer request signal RQb. The signal is given to the compressing/expanding circuit 11 as the DMA transfer enable signal $AK_{COC}$.

RQc: A DMA transfer request signal to the first DMA controller 14. It is processed and outputted by the third gate circuit 23 based on the DMA transfer request signals $RQ_{COI}$ from the image side DMA control portion 11I of the compressing/expanding circuit 11 and the image information input enable signal $RQ_{BS}$ from the source side of the main scanning direction reducing circuit 12.

AKc: A DMA transfer enable signal which the first DMA controller 14 outputs in response to the DMA transfer request signal RQc. The signal is given to the second gate circuit 22 and also is given to the image side DMA control portion 11I of the compressing/expanding circuit 11 through the fourth gate circuit 24 as the DMA transfer enable signal $AK_{COI}$ and is given to the source side DMA control portion 12S of the main scanning direction reducing circuit 12 as the DMA transfer enable signal $AK_{BS}$, respectively.

RQd: A DMA transfer request signal to the second DMA controller 15. This signal is the DMA transfer request signal $RQ_{BD}$ from the destination side DMA control portion 12D of the main scanning direction reducing circuit 12.

AKd: A DMA transfer enable signal which the second DMA controller 15 outputs to the destination side DMA control portion 12D of the main scanning direction reducing circuit 12 as the DMA transfer enable signal $AK_{BD}$ in response to the DMA transfer request signal RQd.

R/W: A read/write signal which the control circuit 1 or each DMA controller outputs to read/write data.

MD: A mode signal which the control circuit 1 outputs to specify the interlock operation mode.

Now, a typical image processing by the apparatus of the invention will be explained.

System operations when an image input processing by means of the image scanner 4 and a reducing processing are performed at the same time, that is, the operations in the case of interlock input will be described referring to a timing chart of FIG. 2.

In this case, the control signal MD outputted from the control circuit 1 is set to "MD=1".

When an original image is read by the image scanner 4 and can be outputted as image information from the scanner interface 5, the scanner interface 5 outputs the DMA transfer request signal $RQ_{SCN}$ to the first gate circuit 21 as shown in FIG. 2(a). On the other hand when enabled to receive image information, the main scanning direction reducing circuit 12 outputs the image information input enable signal $RQ_{BS}$ to the first gate circuit 21 as shown in FIG. 2(b).

At this time, in the gate circuit 21 the control signal MD=1 is set, thus the first gate circuit 21 performs logical product of the DMA transfer request signal $RQ_{SCN}$ and the image information input enable signal $RQ_{BS}$ to output the logical product as DMA transfer request signal RQa to the third DMA controller 20 as shown in FIG. 2(c).

Receiving the DMA transfer request signal RQa, the third DMA controller 20 outputs the system bus acquisition request signal BRQ3 as shown in FIG. 2(d). In response to the system bus acquisition request signal BRQ3 from the third DMA controller 20, when the system bus response signal BACK3 is outputted from the control circuit 1 as shown in FIG. 2(e), the third DMA controller 20 starts the DMA transfer. That is, the third DMA controller 20 outputs the DMA transfer enable signal AKa as shown in FIG. 2(f) and simultaneously outputs the read/write signal R/W as shown in FIG. 2(g). This read/write signal R/W is given as a write signal to the image memory 3 on one side and converted into a read signal to be given to the scanner interface 5 on the other side. The conversion of the write signal into the read signal is performed by a converting means (not shown in FIG. 1) provided on the read/write signal line. The scanner interface 5 receives the read signal and the DMA transfer enable signal AKa to output the image formation to the system bus 2 as shown in FIG. 2(h). Image information outputted to the system bus 2 is written into a page memory area within the image memory 3 by the write signal. In the abovementioned manner, image information transfer from the scanner interface 5 to the image memory is performed.

Figure 1B:
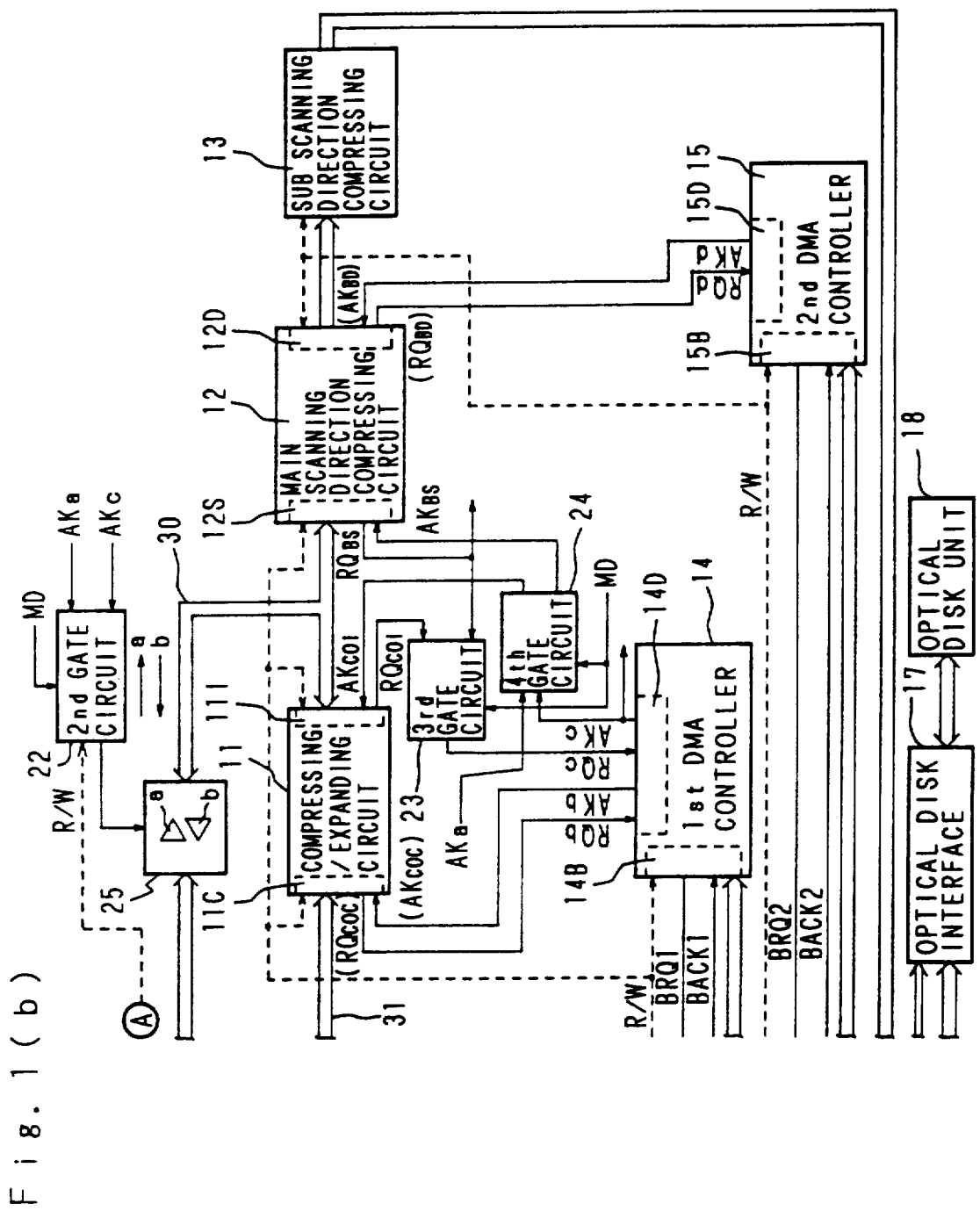

Receiving the control signal MD=1, the DMA transfer enable signal AKa and the write signal for the image memory 3, the second gate circuit 22 outputs the direction control signal D (direction a), thereby controlling the bus driver 25 in such a way that the signal passes the bus driver 25 in the direction of an arrow a in FIG. 1(b), thereby image information outputted from the scanner interface 5 to the system bus 2 goes to the source side DMA control portion 12S of the main scanning direction reducing circuit 12 through the bus driver 25.

Image information thus reached the source side DMA control portion 12S of the main scanning direction reducing circuit 12 is received in the main scanning direction reducing circuit 12 in synchronization with data transfer operation from the scanner interface 5 to the image memory 3 by the third DMA controller 20. More concretely, the source side DMA control portion 12S of the main scanning direction reducing circuit 12 has been given the DMA transfer enable signal $AK_{BS}$ (AKa) outputted from the third DMA controller 20 through the fourth gate circuit 24, thus the main scanning direction reducing circuit 12 receives data from the source side DMA control portion 12S in synchronization with the read/write signal R/W.

Figure 3:
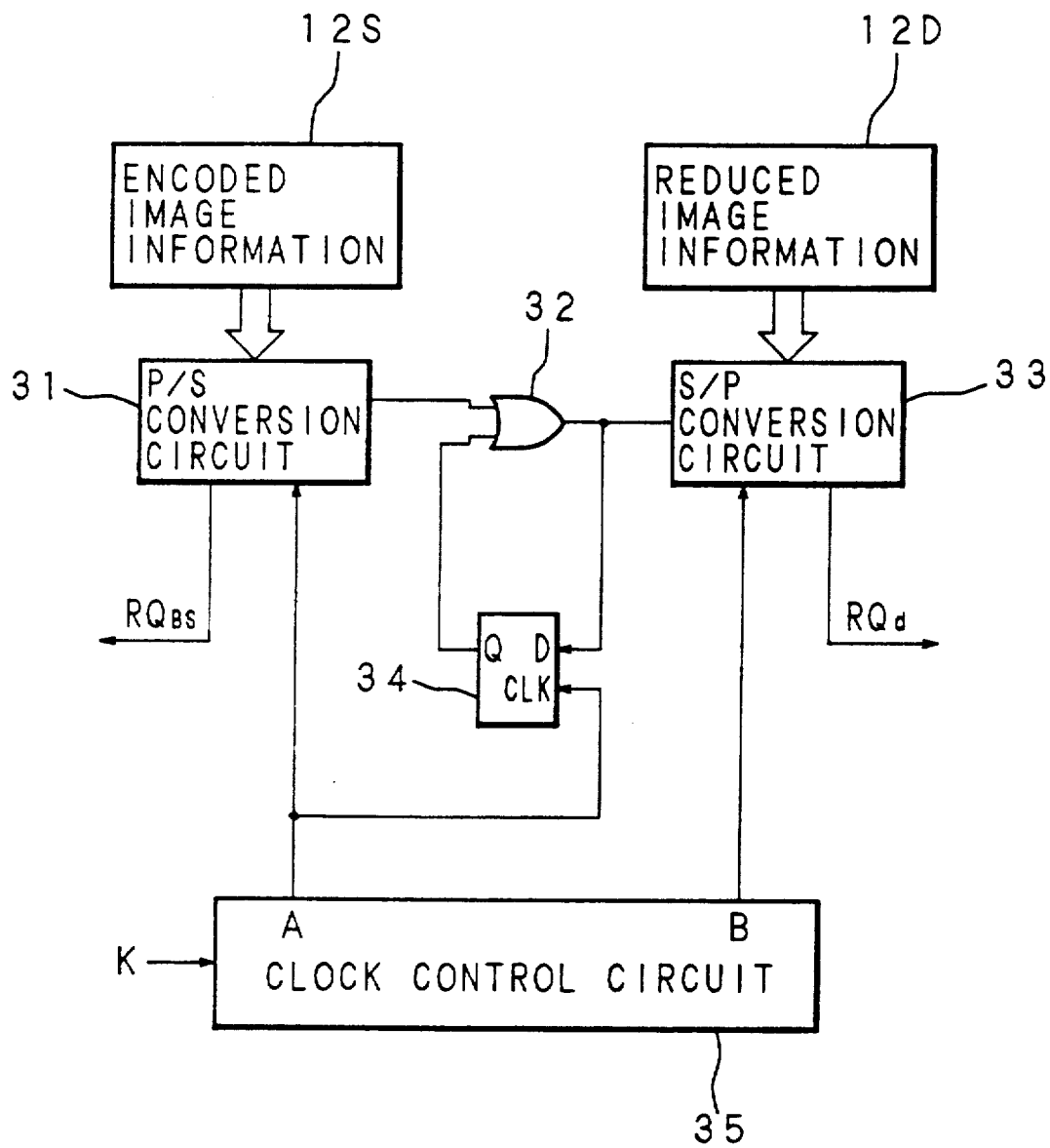
FIG. 3 is a block diagram showing an image reducing circuit of the invention.

The main scanning direction reducing circuit 12 reduces one line image information in the main scanning direction according to a reducing rate K set by the control circuit 1. The reducing processing of the main scanning direction reducing circuit 12 will be more practically explained referring to FIG. 3 which shows the circuit 12 configuration.

Image information inputted to the source side DMA control portion 12S is first inputted by one line data to a P/S (parallel/serial) conversion circuit 31, and then outputted from that sequentially bit by bit in synchronization with a clock A and is inputted to one input terminal of an OR gate 32. The other input terminal of the OR gate 32 has been given a Q-terminal output of a D-type flip-flop 34 described hereafter.

The D-type flip-flop 34 has been supplied with the OR gate 32 output at a D-terminal and supplied with the clock A at a clock (CLK)-terminal. Therefore, the D-type flip-flop 34 outputs input to the D-terminal from the Q-terminal in synchronization with the clock A. Thus the OR gate 32 outputs a logical sum of its own output and the output of the P/S conversion circuit 31. In other words, the output of the OR gate 32 is a result of logical OR operation of a bit being outputted right now from the P/S conversion circuit 31 and one preceding bit.

The output of the OR gate 32 is given to an S/P conversion circuit 33, which receives the output of the OR gate 32 in synchronization with a clock B, thus if the duration of the clock B is made longer than the duration of the clock A, one line image information outputted from the P/S conversion circuit 31 can be reduced. Practically, when the duration of the clock B is made double of the duration of the clock A, only one bit of two bits outputted from the P/s conversion circuit 31 is received by the S/P conversion circuit 33, thus parallel data image information reduced to ½ is obtained in the S/P conversion circuit 33.

Further, a clock control circuit 35 controls clock pulse generation frequencies of both clock A and B according to the reducing rate k.

In addition, the image information input enable signal $RQ_{BS}$ to the first DMA controller 14 is outputted when the P/S conversion circuit 31 becomes free, and the DMA transfer request signal RQd to the second DMA controller 15 is outputted when the S/P conversion circuit 33 is supplied with image information.

When image information reduced by the main scanning direction reducing circuit 12 is finished, that is, image information is inputted to the S/P conversion circuit 33, the main scanning direction reducing circuit 12 outputs the DMA transfer request signal RQd to the second DMA controller 15. In response to this DMA transfer request signal RQd, the second DMA controller 15 transmits the DMA transfer enable signal AKd to the main scanning direction reducing circuit 12 and simultaneously transfers to the subscanning direction reducing circuit 13 image information reduced according to the reducing rate k set by the control circuit 1 (reduced image information in the scanning direction) to make the circuit 13 read image information. In this case the main scanning direction reducing circuit 12, using its internal means for calculating a subscanning direction reducing rate k, instructs to a reducing circuit 13 that whether or not the circuit 13 thins out an image information line to be transferred.

Although the subscanning direction reducing circuit 13 is not shown in detail, it is comprised of a two-port memory using a dynamic RAM (reduced image memory means) and a memory control circuit which performs control and refreshing for image information storage in the above memory, and one port of the memory is connected to the main scanning direction reducing circuit 12 and the other port is connected to the system bus 2. The other port is so configured that it can perform read modify write and when, for example, three lines is reduced into one line, the first line is written by the normal write operation and the second and third lines are written with a logical summing (read modify write) at the same position as the first line, thereby the three lines are overwritten into one line to reduce image information in the subscanning direction.

The reason why the subscanning direction reducing circuit 13 performs logical sum-write is that it prevents a line from thinning or breaking when reduced image information by thinning out processing. A write mode to the subscanning direction reducing circuit 13 is determined line by line by reducing line instruction from the main scanning direction reducing circuit 12 which indicates that which mode is performed the normal write or logical sum-write.

Further, the logical sum processing is employed in the above example, but other logical operations can be used for reducing image information and a simple thinning out processing without the logical operation may also be used for this purpose.

In this way, image information can be reduced by using the main scanning direction reducing circuit 12 and subscanning direction reducing circuit 13, thereby one screen of reduced image information can be obtained in the circuit 13.

Thereafter, reduced image information in the circuit 13 is transferred to a frame memory 10 through the system bus 2 by a CRT controller 8 to display an image on the CRT display 9.

At this time, reducing of image information is performed simultaneously when image information inputted from the image scanner 4 is transferred to the image memory 3, thus read image information is displayed on the CRT display 9 after a little waiting time.

As mentioned above, reading an original image by the image scanner 4 and its display on the CRT display 9 are performed and simultaneously image information is stored in the image memory 3.

Image information stored in the image memory 3 can be edited when necessary.

A simple compression processing and interlock compression processing are explained in which image information stored in the image memory 3 is compressed, encoded and then stored in the optical disk unit 18 referring to timing charts of FIGS. 4 and 5.

First, the control circuit 1 makes the first DMA controller 14 transfer image information from the image memory 3 to the compressing/expanding circuit 11 to compress and encode image information stored in the image memory 3.

Operations in this case are different depending on a set value of the control signal MD. In the case of the simple compression processing in which a reduced image is not produced when compressing and encoding image information, the control signal MD=0 is set, on the other hand in the case of the interlock compression processing in which a reduced image is simultaneously produced, the control signal MD=4 is set.

In the case of the simple compression processing set at the control signal MD=0, the image information input request signal $RQ_{COI}$ outputted from the compressing/expanding circuit 11 and inputted to the third gate circuit 23 is directly inputted to the first DMA controller 14 as the DMA transfer request signal RQc as shown in FIG. 4(a). Further, the DMA transfer enable signal AKc outputted from the first DMA controller 14 and inputted to the fourth gate circuit 24 is inputted to only the compressing/expanding circuit 11 as the DMA transfer enable signal $AK_{COI}$ by the fourth gate circuit 24 as shown in FIG. 4(d).

Also, on receiving the control signal MD=0, the DMA transfer enable signal AKc and the read signal for the image memory 3, the second gate circuit 22 outputs the direction control signal D (direction a), so that the bus driver 25 is controlled to pass the signals in direction of the arrow a in FIG. 1.

When the image information input request signal $RQ_{COI}$ outputted from the compressing/expanding circuit 11 is inputted to the first DMA controller 14 through the third gate circuit 23, the controller 14 outputs the system bus acquisition request signal BRQ1 as shown in FIG. 4(b). In response to this signal, as shown in FIG. 4(c), the control circuit 1 outputs the system bus response signal BACK1, thereby the first DMA controller 14 obtains a right to use the system bus 2, and thereafter outputs the DMA transfer enable signal AKc and outputs the read/write signal R/W during the DMA transfer enable signal AKc is outputted as shown in FIG. 4(e). This read/write signal R/W is given as a read signal to the image memory 3 and also converted into a write signal to be given to the compressing/expanding circuit 11. In response to this read signal outputted from the first DMA controller 14, image information stored in the image memory 3 is outputted to the system bus 2 as shown in FIG. 4(f). The DMA transfer enable signal AKc is inputted to the compressing/expanding circuit 11 through the fourth gate circuit 24 as the DMA transfer enable signal $AK_{COI}$. When the compressing/expanding circuit 11 receives the DMA transfer enable signal $AK_{COI}$ and the write signal outputted from the first DMA controller 14, the image side DMA control portion 11I receives the image information outputted from the image memory 3 in synchronization with the write signal.

As mentioned above, every time the compressing/expanding circuit 11 produces one word of encoded data from image information inputted to the image side DMA control portion 11I via the bus driver 25, the compressing/expanding circuit 11 outputs the DMA transfer request signal RQb to the first DMA controller 14 to transfer encoded image information as shown in FIG. 4(g). In response to this signal, the first DMA controller 14 transmits the system bus acquisition request signal BRQ1 to the control circuit 1 and therefrom receives the system bus response signal BACK1 to obtain a right to use the system bus 2 as shown in FIG. 4(b), (c). Thereafter, as shown in FIG. 4(h), the first DMA controller 14 outputs the DMA transfer enable signal AKb to the compressing/expanding circuit 11 and outputs the read/write signal R/W during the DMA transfer enable signal AKb is outputted as shown in FIG. 4(e). This read/write signal R/W is given as a write signal to the image memory 3 and converted into a read signal to be given to the compressing/expanding circuit 11. The code side DMA control portion 11C of the compressing/expanding circuit 11 outputs encoded image information to the system bus 2 in response to an AND signal of the DMA transfer enable signal AKb and the read/write signal R/W as shown in FIG. 4(f). The image memory 3 stores the image information on the system bus 2 in a code buffer area in response to the read/write signal R/W.

When compressing and encoding of image information and transfer of compressed and encoded image information to the image memory 3 are finished as one screen of image information, compressed and encoded image information is transferred to the optical disk unit 18 via the optical disk interface 17 to be recorded on the optical disk.

In the case of the interlock compression processing set at the control signal MD=4, a signal resulting from a logical product of the image information input request signal $RQ_{COI}$ outputted from the compressing/expanding circuit 11 and inputted to the third gate circuit 23 shown in FIG. 5(a) and the image information input enable signal $RQ_{BS}$ outputted from the main scanning direction reducing circuit 12 shown in FIG. 4(b) is inputted to the first DMA controller 14 as the DMA transfer request signal RQc as shown in FIG. 4(c).

That is, when the image information input request signal $RQ_{COI}$ outputted from the compressing/expanding circuit 11 is inputted to the third gate circuit 23, inputting of image information to the main scanning direction reducing circuit 12 is possible and the image information input enable signal $RQ_{BS}$ has already been outputted to the third gate circuit 23, the third gate circuit 23 outputs the DMA transfer request signal RQc to the first DMA controller 14.

The first DMA controller 14, which has received the DMA transfer request signal RQc, outputs the system bus acquisition request signal BRQ1 as shown in FIG. 5(d). In response to this signal, the control circuit 1 outputs the system bus response signal BACK1 as shown in FIG. 5(e), and in response to the signal BACK1 the first DMA controller 14 outputs the DMA transfer enable signal AKc as shown in FIG. 5(g), simultaneously outputs the read/write signal R/W as shown in FIG. 5(f) during the DMA transfer enable signal AKc is outputted. This read/write signal R/W is given as a read signal to the image memory 3 and converted into a write signal to be given to the compressing/expanding circuit 11. The image memory 3 outputs image information to the system bus 2 in response to this read/write signal R/W as shown in FIG. 5(h).

In addition, the bus driver 25 is controlled to pass e signal in direction of the arrow a as same as the case of the simple compressing processing (MD=0).

The compressing/expanding circuit 11 receives image information on the system bus 2 in response to an AND signal of the DMA transfer enable signal $AK_{COI}$ as the DMA transfer enable signal AKc and the read/write signal R/W.

At this time, in synchronization with a transfer operation in which the first DMA controller 14 makes the compressing/expanding circuit 11 receive image information from the image memory 3, the main scanning direction reducing circuit 12 receives image information from the source side DMA control portion 12S. This image information receiving operation by the main scanning direction reducing circuit 12 is the same as the above case of the control signal MD=1, and the circuit 12 receives data at its source side DMA control portion 12S in synchronization with the read/write signal R/W while the first DMA controller 14 outputs the DMA transfer enable signal $AK_{BS}$ (AKc).

Every time the compressing/expanding circuit 11 produces one word of code data, the circuit 11 outputs the DMA transfer request signal RQb to the first DMA controller 14 as shown in FIG. 5(i). In response to this signal, the first DMA controller 14 transmits the system bus acquisition request signal BRQ1 to the control circuit 1 and therefrom receives the system bus response signal BACK1 to acquire a right to use the system bus 2. Thereafter the first DMA controller 14 outputs the DMA transfer enable signal AKb as a response signal as shown in FIG. 5(j) and simultaneously outputs the read/write signal R/W as shown in FIG. 5(g). This read/write signal R/W is given as a write signal to the image memory 3 and converted into a read signal to be given to the compressing/expanding circuit 11. In response to an AND signal of this read signal and the DMA transfer enable signal AKb, the compressing/expanding circuit 11 outputs code data to the system bus 2. While code data is outputted to the system bus 2, in response to the write signal transmitted to the image memory 3, the image memory 3 receives code data in its code buffer area.

In this way, when compression and encoding of image information of one screen and transfer of compressed and encoded image information to the image memory 3 is finished, a reduced image is produced in the memory at the subscanning direction reducing circuit 13. Thereafter encoded image information is transferred to the optical disk unit 18 via the optical disk interface 17 to be stored on the optical disk.

Then, a processing for expanding compressed and encoded image information stored on the optical disk in the optical disk unit 18 to decode it into the original image, and a processing for expanding decoded image information to store it in the image memory 3, that is, the interlock expanding processing will be explained referring to a timing chart in FIG. 6.

In this case, the control signal is set to MD=2.

Desired image information (which is compressed and encoded) stored on the optical disk in the optical disk unit 18 is read and stored in the code buffer memory area of the image memory 3 through the optical disk interface 17.

When the DMA transfer request signal RQb outputted from the compressing/expanding circuit 11 is given to the first DMA controller 14 as shown in FIG. 6(a), the controller 14 outputs the system bus acquisition request signal BRQ1 as shown in FIG. 6(b). In response to this signal BRQ1, the control circuit 1 outputs the system bus response signal BACK1 to the first DMA controller 14 as shown in FIG. 6(c). At this time, the first DMA controller 14 gives the DMA transfer enable signal AKb to the compressing/expanding circuit 11 as shown in FIG. 6(d) and simultaneously the read/write signal R/W is outputted while the DMA transfer enable signal AKb is outputted as shown in FIG. 6(e). This read/write signal R/W is given as a read signal to the image memory 3 and converted into a write signal to be given to the compressing/expanding circuit 11. As a result, compressed and encoded image information is outputted from the image memory 3 to the system bus 2 in response to the read signal. Responsive to an AND signal of the DMA transfer enable signal AKb and the write signal, the compressing/expanding circuit 11 receives compressed and encoded data outputted to the system bus 2 to attain the DMA transfer.

The compressing/expanding circuit 11 expands and decodes one word of image information thus transferred. In order to transfer decoded image information, the compressing/expanding circuit 11 outputs the image information transfer request signal RQ$_{COI}$ to the first DMA controller 14 through the third gate circuit 23 as shown in FIG. 6(g). At this time, when the image information input enable signal RQ$_{BS}$, which shows that encoded image information is enabled to be inputted, has been given to the third gate circuit 23 from the main scanning direction reducing circuit 12 as shown in FIG. 6(h), the third gate circuit 23 gives the DMA transfer request signal RQc to the first DMA controller 14 as shown in FIG. 6(i).

Receiving a decoded image information transfer request, the first DMA controller 14 transmits the system bus acquisition request signal BRQ1 to the control circuit 1 and therefrom receives the system bus response signal BACK1 to acquire a right to use the system bus 2 as shown in FIG. 6(b), (c), and thereafter the controller 14 outputs the DMA transfer enable signal AKc to the second gate circuit 22 and to the fourth gate circuit 24 as shown in FIG. 6(f) and simultaneously outputs the read/write signal R/W as shown in FIG. 6(e). This read/write signal R/W is given as a write signal to the image memory 3 and converted into a read signal to be given to the compressing/expanding circuit 11.

Receiving the control signal MD=2, the DMA transfer enable signal AKc and the write signal for the image memory 3, the second gate circuit 22 outputs the direction control signal D (direction b), so that the driver 25 is controlled to pass the signal in the direction of the arrow b. Further, receiving the DMA transfer enable signal AKc, the fourth gate circuit 24 outputs the DMA transfer enable signal AK$_{COI}$ to the compressing/expanding circuit 11 and outputs the DMA transfer enable signal AK$_{BS}$ to the main scanning direction reducing circuit 12, thereby responding to an AND signal of the DMA transfer enable signal AK$_{COI}$ and the read signal, the compressing/expanding circuit 11 outputs decoded image information to the system bus 2 and simultaneously the image memory 3 stores in its page memory area the data outputted to the system bus 2 through the sub-bus 30 in synchronization with the write signal.

At this time, the main scanning direction reducing circuit 12 receives image information in synchronization with transfer of data from the compressing/expanding circuit 11 to the image memory 3 performed by the first DMA controller 14. In this image information receiving operation performed by the main scanning direction reducing circuit 12, the circuit 12 steals data transferring from image processing means (here, compressing/expanding circuit 11) to the image memory 3 by using the transfer enable signal outputted from the DMA controller and the read/write signal in the same manner as the cases of the control signal MD=1 (interlock input processing) and the control signal MD=4 (interlock compression processing).

Image information inputted to the main scanning direction reducing circuit 12 is first reduced in the main scanning direction as mentioned above and then reduced in the subscanning direction by the subscanning direction reducing circuit 13.

In the abovementioned manner, image information which has been compressed, encoded and then stored in optical disk is sequentially decoded by the compressing/expanding circuit 11 and decoded image information is written into the image memory 3 and simultaneously one screen of reduced image information is produced in the subscanning direction reducing circuit 13.

Thereafter, reduced image information in the circuit 13 is transferred to the frame memory 10 by the CRT controller 8 to be displayed on the CRT display 9.

When an operator desires to sequentially read image information recorded on the optical disk in the optical unit 18 and to display the reduced image on the CRT display 9, the control signal is set to MD=3.

In this case, reading of image information from the optical disk unit 18, decoding and compressing processings and transfer of image information to the frame memory 10 are performed in parallel. At this time, when a plurality of code buffer areas are set in the image memory 3 and a two pages of area for the subscanning direction reducing circuit 13 are prepared, the processing can be effectively implemented.

Further, when the operator only wants to confirm image information stored in the optical disk unit 18, he only needs to display decoded image information on the CRT display 9. Operations in such a case will be explained.

When the first DMA controller 14 can perform DMA transfer to a space other than a system space (a space in which data is transferred via the system bus 2), for example, a memory space dedicated to the first DMA controller 14 itself, and further when expanded and decoded image information is transferred to such a virtual space and simultaneously reduced image information is produced, decoded image information is not store in the image memory 3 and only reduced image information is obtained. Such a processing is called a virtual interlock expansion processing.

According to such a virtual interlock expansion processing, there is no need to prepare an area for storing decoded image information in the image memory 3, thus the memory 3 can be effectively used.

Further, when decoded image information is transferred, the system bus 2 is not used, thus other components may use it.

Figure 7A:
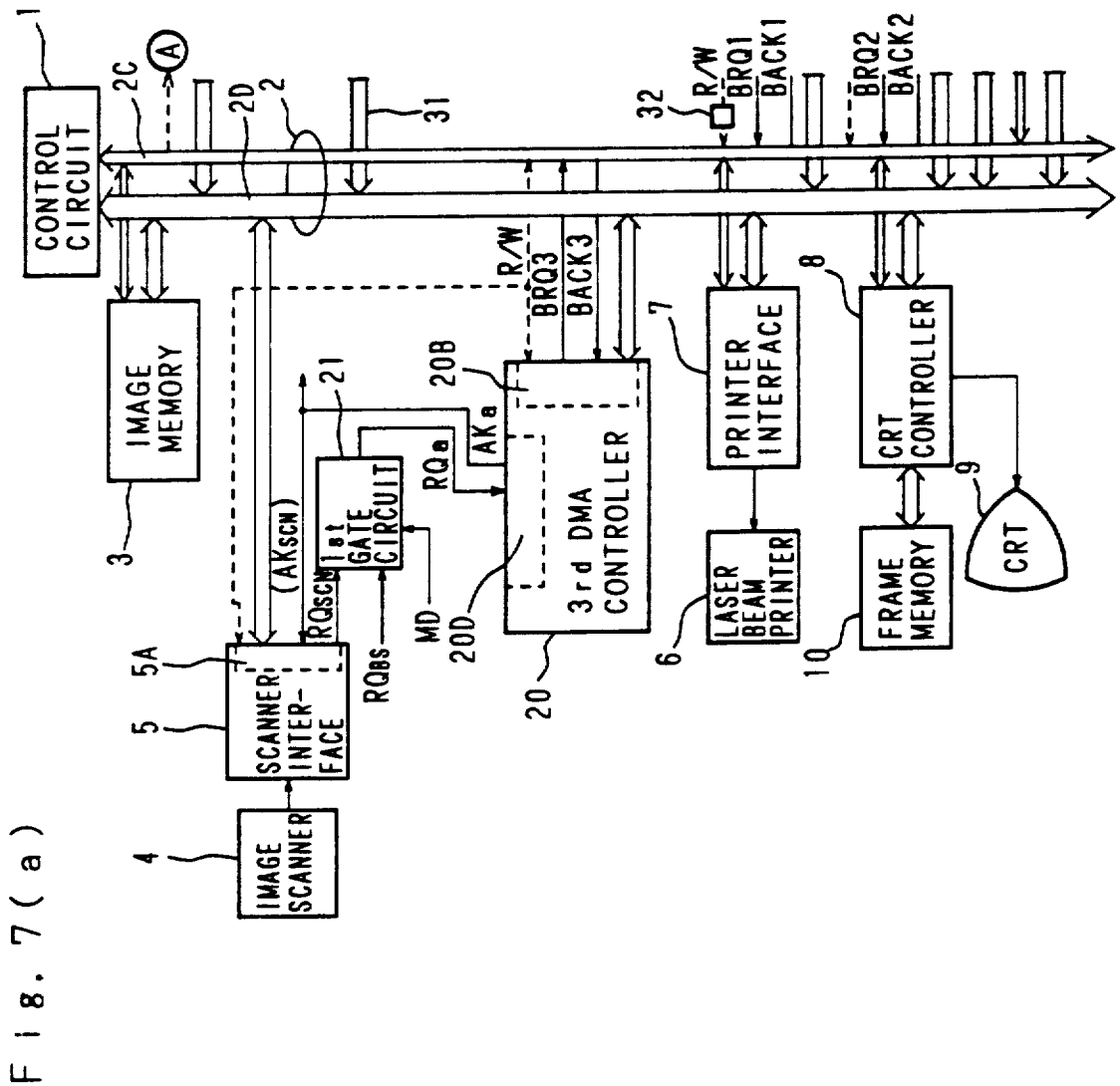
Figure 7B:
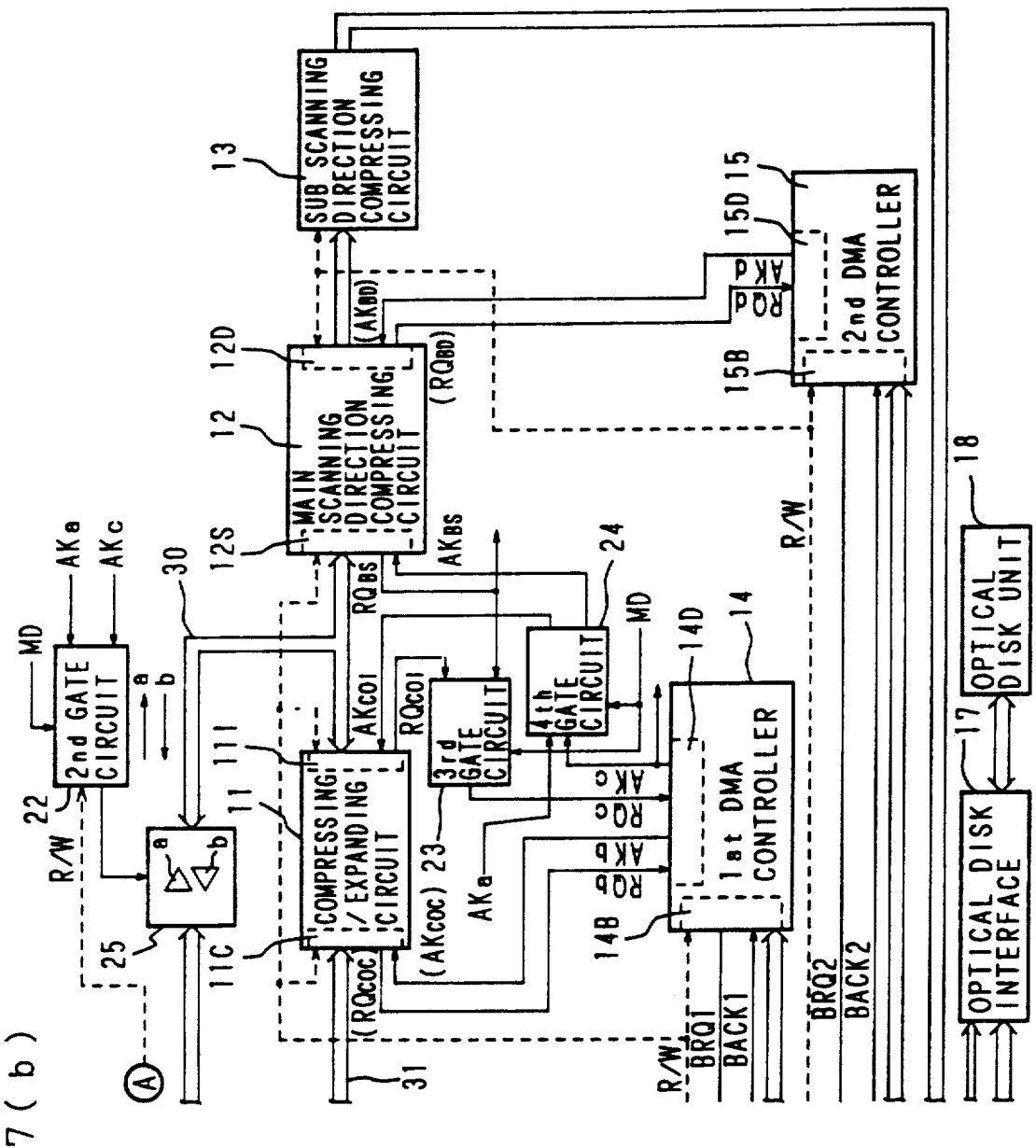

A circuit configuration for performing such a virtual interlock expansion processing is shown in a block diagram in FIG. 7. A difference between the circuit configurations of FIGS. 1(a), (b) and 7(a), (b) is that a gate 32 is provided on the read/write signal R/W path between the first DMA controller 14 and the control bus 2C of the system bus 2 in FIGS. 7(a) and 7(b). This gate 32 is provided to interrupt a read/write signal R/W passing from the first DMA controller 14 to the control bus 2C when necessary.

FIG. 8 shows a timing chart for the virtual interlock expansion processing being made possible by using the configuration shown in FIGS. 7(a) and 7(b). This timing chart is basically the same as that of the interlock expansion processing shown in FIG. 6.

On comparison both of the interlock expansion processings with each other, both of the transfer operations of code data from the image memory 3 to the compressing/expanding circuit 11 are the same except that image information expanded and decoded by the compressing/expanding circuit 11 (decoded data) is transferred to a virtual transfer destination. At this time, the first DMA controller 14 does not output the system bus acquisition request signal BRQ1, thus the system bus response signal BACK1 also is not produced. The second gate circuit 22 is provided with a control means (not shown) which cuts off the gate 23 and the bus driver 25 during the system bus response signal BACK1 is not outputted. The control means abovementioned is controlled by the enable signal line 33.

As can be seen from the foregoing, the compressing/expanding circuit 11 outputs decoded data (image information) to the sub-data bus 30 in synchronization with the read/write signal R/W as shown in FIG. 8(e) while of the DMA transfer enable signal AKc is outputted as shown in FIG. 8(j). Simultaneously, when the main scanning direction reducing circuit 12 has been supplied with the DMA transfer enable signal AKc as the DMA transfer enable signal $AK_{BS}$, the circuit 12 receives in synchronization with the read/write signal R/W the image information outputted from the compressing/expanding circuit 11 to the sub-data bus 30. As mentioned above, the virtual interlock expansion processing, that is, a processing of reduced image information by using the main scanning direction reducing circuit 12 and the subscanning direction reducing circuit 13 without storing image information in the image memory 3 can be achieved.

As mentioned above, according to the invention, image information read by an image scanner or image information obtained by decoding compressed and encoded image information stored on an optical disk is written into an image memory and simultaneously is given to a main scanning direction reducing circuit and a subscanning direction reducing circuit to undergo a reducing processing, therefore reading and reducing one screen of image information or decoding and expanding, encoded image information can be implemented in parallel. Thus time necessary for filing is shortened and operator's waiting time is reduced, also operability and speed up of an image information filing unit are attained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An imaging processing apparatus comprising:
   a system bus for transmitting signals including image information and control signals;
   a memory, connected to said system bus, for storing image information;
   data transfer means, connected to said system bus, for transferring data in response to transfer request;
   a sub-bus managed and controlled by said data transfer means;
   first image processing means, connected to said sub-bus, for processing image information and outputting processed image information;
   second image processing means, connected to said sub-bus, for receiving image information and processing received image information;
   a gate means for connecting/cutting off said system bus and said sub-bus, and for controlling data flow direction;
   transfer request generating means, connected to said first image processing means, said second image processing means and said data transfer means, for generating an image information transfer request from said first image processing means to said memory for said data transfer means on receiving an image information output request from said first image processing means and receiving an image information input request from said second image processing means;
   whereby said data transfer means transfers image information from said first image processing means to said memory if said transfer request generating means generates an image information transfer request;

said gate means connects said system bus and said sub-bus to output image information in said system bus during said image information transfer; and said second image processing means receives image information outputted in said sub-bus in synchronization with operation of receiving image information outputted in said system bus by said memory.

2. An image processing apparatus as set forth in claim 1 wherein:

said first image processing means is means for expanding (recoding) image information; and said second image processing means is means for enlarging/reducing image information.

3. An image processing apparatus comprising:

a system bus for transmitting signals including image information and control signals;

a memory, connected to aid system bus, for storing image information;

data transfer means, connected to said system bus, for transferring data in response to transfer request;

a sub-bus managed and controlled by said data transfer means;

first image processing means, connected to said sub-bus for receiving image information and processing received image information;

second image processing means, connected to said sub-bus, for receiving image information and processing received image information;

a gate means for connecting/cutting off said system bus and said sub-bus, and for controlling data flow direction;

transfer request generating means, connected to said first image processing means, said second image connected means and said data transfer means, for generating an image information transfer request from said memory to said first image processing means for said data transfer means on receiving an image information input requests from said first image processing means and said second image processing means, respectively;

whereby said data transfer means transfers image information from said memory to said first image processing means if said transfer request generating means generates an image information transfer request;

said gate means connects said system bus and said sub-bus to output image information in said sub-bus during said image information transfer; and said second image processing means receives image information outputted in said sub-bus in synchronization with operation of receiving image information outputted in said sub-bus by said first image processing means.

4. An image processing apparatus as set forth in claim 1, further comprising means for selecting whether said second image processing means receives data or not.

5. An image processing apparatus comprising:

a system bus for transmitting signals including image information and control signals;

first image processing means, connected to said system bus, for processing image information and for outputting processed data;

a memory, connected to said system bus, for storing image information;

first data transfer means, connected to said system bus, for transferring data from said first image processing means to said memory;

second data transfer means, connected to said system bus, for transferring data in response to transfer request;

a sub-bus managed and controlled by said second data transfer control means;

gate means for connecting/cutting off said system bus and said sub-bus, and for controlling data flow direction;

second image processing means, connected to said sub-bus, for receiving image information and processing received image information; and transfer request generating means for generating an image information transfer request from said first image processing means to a memory field for said first data transfer on receiving an image information output request from said first image processing means and receiving an image information input request from said second image processing means, whereby said first data transfer control means transfers image information from said first image processing means to said memory if said transfer request generating means generates an image information transfer request;

said gate means connects said system bus and said sub-bus to output image information in said sub-bus during said image information transfer; and said second image processing means receives image information outputted in said sub-bus in synchronization with operation of receiving image information outputted in said system bus by said memory.

6. An image processing apparatus as set forth in claim 7 wherein:

said first image processing means is means for reading an original image to convert it into image information; and said second image processing means is means for enlarging/reducing image information.

7. An image processing apparatus as set forth in claim 5, further comprising means for selecting whether said second image processing means receives data or not.

8. An image processing apparatus as set forth in claim 3, wherein:

said first image processing means is means for compressing (encoding) image information; and said second image processing means is means for enlarging/reducing image information.

9. An image processing apparatus as set forth in claim 3, further comprising means for selecting whether said second image processing means receives data or not.

10. An image processing apparatus comprising:

a system bus for transmitting signals including image information and control signals;

data transfer control means, connected to said system bus, for transferring data in response to a transfer request;

a sub-bus managed and controlled by said data transfer control means;

gate means for connecting/cutting off said system bus and said sub-bus, and for controlling data flow direction;

first image processing means, connected to said sub-bus, for processing image information and outputting processed image information;

second image processing means, connected to said sub-bus, for receiving image information and processing received image information; and transfer request generating means for generating an image information transfer request from said first image processing means to a memory field on receiving an image information output request or output enable signal from said first image processing means and receiving an image information input request or input enable signal from said second image processing means;

whereby said data transfer control means transfers image information from said first image processing means to said memory field if said transfer request generating means generates an image information transfer request;

said gate means cuts off said system bus and said sub-bus during image information transfer; and said second image processing means receives image information in said sub-bus in synchronization with image information transfer by said data transfer control means.

11. An image processing apparatus as set forth in claim 10, wherein:
said first image processing means is means for expanding/decoding image information, and
said second image processing means is means for enlarging/reducing image information.

12. An image processing apparatus as set forth in claim 10 wherein:
said data transfer control means, after receiving a transfer request, outputs a transfer enable signal and simultaneously outputs a read/write signal,
said first image processing means outputs image information to said sub-bus in response to a transfer enable signal and a read/write signal outputted from said data transfer control means;
said second image processing means receives in synchronization with said read/write signal said image information outputted to said sub-bus while said data transfer control means outputs a transfer enable signal; and
said gate means cuts off the image information from said sub-bus to said system bus.

* * * * *